United States Patent [19]
Roach

[11] Patent Number: 6,094,852
[45] Date of Patent: Aug. 1, 2000

[54] FISHING POLE TIP-UP SYSTEM

[76] Inventor: William J. Roach, 928 N. 9th St., Bismarck, N. Dak. 58501

[21] Appl. No.: 09/234,940

[22] Filed: Jan. 21, 1999

[51] Int. Cl.⁷ .................................................. A01K 97/12
[52] U.S. Cl. ..................................................... 43/16; 43/17
[58] Field of Search ........................................... 43/15–17

[56] References Cited

U.S. PATENT DOCUMENTS

| | | | |
|---|---|---|---|
| 1,021,147 | 3/1912 | Green | 43/17 |
| 1,777,496 | 10/1930 | Killory | 43/17 |
| 1,803,914 | 5/1931 | Oberg | 43/17 |
| 2,624,972 | 1/1953 | Burg | 43/17 |
| 2,732,649 | 1/1956 | Tuttle | 43/17 |
| 3,199,241 | 8/1965 | Mauritz | 43/17 |
| 3,824,730 | 7/1974 | Johnson | 43/17 |
| 4,373,287 | 2/1983 | Grahl | 43/17 |
| 4,397,113 | 8/1983 | Pinson | 43/15 |
| 4,633,608 | 1/1987 | Savarino | 43/17 |
| 5,050,332 | 9/1991 | Cross | 43/15 |
| 5,050,333 | 9/1991 | Debreczeni | 43/17 |
| 5,339,558 | 8/1994 | Monsen | 43/17 |
| 5,890,312 | 4/1999 | Ball | 43/16 |

*Primary Examiner*—Michael J. Carone
*Assistant Examiner*—Son T. Nguyen
*Attorney, Agent, or Firm*—Michael S. Neustel

[57] ABSTRACT

A fishing pole tip-up system for signaling to a fisherman that a fish bite has occurred using a conventional fishing rod. The inventive device includes a shaft having a pointed lower end, a stability member attached to the shaft near the lower end, a rod support pivotally attached to the upper end of the shaft, an indicator structure attached to the upper end of the shaft, and a catch member pivotally attached to the shaft. The lower end of the shaft is designed to penetrate all types of ground surfaces such as sand, gravel or dirt. The rod support comprises a first claw and a second claw for releasably retaining a conventional fishing rod in a relatively horizontal position. The indicator structure comprises a flex spring attached to the upper end of the shaft, and a pole with a flag attached to the flex spring opposite of the shaft. The catch member includes a slot, wherein the slot releasably captures the pole of the indicator structure. A catch spring is attached to the distal end of the catch member for releasably capturing a fishing line from the fishing rod. When a fish bite occurs, the fishing line is tensioned thereby rotating the catch member toward a parallel position with respect to the fishing rod thereby releasing the pole. The pole is forced into a vertical position by the flex spring thereby indicating that a fish has striked. When the catch member is substantially parallel to the fishing rod, the coils of the catch spring are substantially parallel to the fishing rod thereby allowing the fishing line to be easily removed with little pulling force from the fish.

20 Claims, 3 Drawing Sheets

FISHING POLE TIP-UP SYSTEM

BACKGROUND OF THE INVENTION

1. Field of the Invention

The present invention relates generally to fishing rigs and more specifically it relates to a fishing pole tip-up system for signaling to a fisherman that a fish bite has occurred using a conventional fishing rod.

Conventional "tip-up" devices are designed for use within ice holes for ice fishing. However, these conventional tip-up devices are not suitable for use during non-ice conditions nor with conventional elongated fishing rods. Hence, there is a need for a fishing pole tip-up system that signals to a fisherman when a strike occurs and that accepts a conventional elongated fishing rod.

2. Description of the Prior Art

Fishing rigs have been in use for years. Typically, conventional fishing rigs that indicate that a fish bite has occurred are designed solely for ice fishing. These conventional fishing rigs usually have a reel structure for storing and winding the fishing line required for fishing. However, conventional fishing rigs do not provide a structure that easily receives a conventional fishing rod and that indicates when a fish has bitten.

Examples of fishing rigs include U.S. Pat. No. 5,501,028 to Hull et al; U.S. Pat. No. 5,050,333 to Debreczeni; U.S. Pat. No. 5,129,174 to Wilson; U.S. Pat. No. 5,586,402 to Brent et al; U.S. Pat. No. 5,063,373 to Lindsley; U.S. Pat. No. 5,551,183 to Solem; U.S. Pat. No. 5,269,088 to Slaback, Jr. et al; U.S. Pat. No. 5,152,093 to Bartys; U.S. Pat. No. 2,784,516 to Barnes et al; U.S. Pat. No. 5,570,532 to Shaffer et al; U.S. Pat. No. 5,339,558 to Monsen; U.S. Pat. No. 5,448,849 to Burgett; U.S. Pat. No. 5,488,796 to Taylor et al are all illustrative of such prior art.

Hull et al (U.S. Pat. No. 5,501,028) discloses a fishing rod holder with bite signaling means. Hull et al teaches a probe that is penetrable into a ground surface, a ratcheting apparatus that allows the pole to assume a more horizontal position to indicate that a fish bite has occurred.

Debreczeni (U.S. Pat. No. 5,050,333) discloses a fishing rig. Debreczeni teaches a base, a fishing rod support, a flag and staff mounted to the base and loosely engaged to a line responsive triggering mechanism also mounted to the support.

Wilson (U.S. Pat. No. 5,129,174) discloses a fishing line holder. Wilson teaches a spring steel clip that snaps around a pole, a plastic pinching device to hold the line, an adjustment screw with a threadably attached nut, and a spring wire with plastic on one end to indicate a strike.

Brent et al (U.S. Pat. No. 5,586,402) discloses a fishing rod bite indicator. Brent teaches a detachable clamping mechanism, a visual indicator rod within a slide tube, a spiral line guide and an adjusting clip that provides the proper alignment of the visual indicator rod.

Lindsley (U.S. Pat. No. 5,063,373) discloses a fising rod holder with fish alert. Lindsley teaches a device that triggers a sound alarm to alert a fisherman when a strike occurs.

While these devices may be suitable for the particular purpose to which they address, they are not as suitable for signaling to a fisherman that a fish bite has occurred using a conventional fishing rod. Conventional tip-up devices are not designed to accept a conventional elongated fishing rod.

In these respects, the fishing pole tip-up system according to the present invention substantially departs from the conventional concepts and designs of the prior art, and in so doing provides an apparatus primarily developed for the purpose of signaling to a fisherman that a fish bite has occurred using a conventional fishing rod.

SUMMARY OF THE INVENTION

In view of the foregoing disadvantages inherent in the known types of tip-up devices now present in the prior art, the present invention provides a new fishing pole tip-up system construction wherein the same can be utilized for signaling to a fisherman that a fish bite has occurred using a conventional fishing rod.

The general purpose of the present invention, which will be described subsequently in greater detail, is to provide a new fishing pole tip-up system that has many of the advantages of the tip-up devices mentioned heretofore and many novel features that result in a new fishing pole tip-up system which is not anticipated, rendered obvious, suggested, or even implied by any of the prior art tip-up devics, either alone or in any combination thereof.

To attain this, the present invention generally comprises a shaft having a pointed lower end, a stability member attached to the shaft near the lower end, a rod support pivotally attached to the upper end of the shaft, an indicator structure attached to the upper end of the shaft, and a catch member pivotally attached to the shaft. The lower end of the shaft is designed to penetrate all types of ground surfaces such as sand, gravel or dirt. The rod support comprises a first claw and a second claw for releasably retaining a conventional fishing rod in a relatively horizontal position. The indicator structure comprises a flex spring attached to the upper end of the shaft, and a pole with a flag attached to the flex spring opposite of the shaft. The catch member includes a slot, wherein the slot releasably captures the pole of the indicator structure. A catch spring is attached to the distal end of the catch member for releasably capturing a fishing line from the fishing rod. When a fish bite occurs, the fishing line is tensioned thereby rotating the catch member toward a parallel position with respect to the fishing rod thereby releasing the pole. The pole is forced into a vertical position by the flex spring thereby indicating that a fish has striked. When the catch member is substantially parallel to the fishing rod, the coils of the catch spring are substantially parallel to the fishing rod thereby allowing the fishing line to be easily removed with little pulling force from the fish.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a fishing pole tip-up system that will overcome the shortcomings of the prior art devices.

Another object is to provide a fishing pole tip-up system that removably receives most designs of conventional elongated fishing rods.

An additional object is to provide a fishing pole tip-up system that is very sensitive to a fish bite.

A further object is to provide a fishing pole tip-up system that visually indicates to a fisherman when a fish bite occurs.

Another object is to provide a fishing pole tip-up system that is portable and simple to use.

An additional object is to provide a fishing pole tip-up system that allows a fish to strike the bait and take line without feeling resistance.

Another object is to provide a fishing pole tip-up system that is collapsible into a compact storage and transport position.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
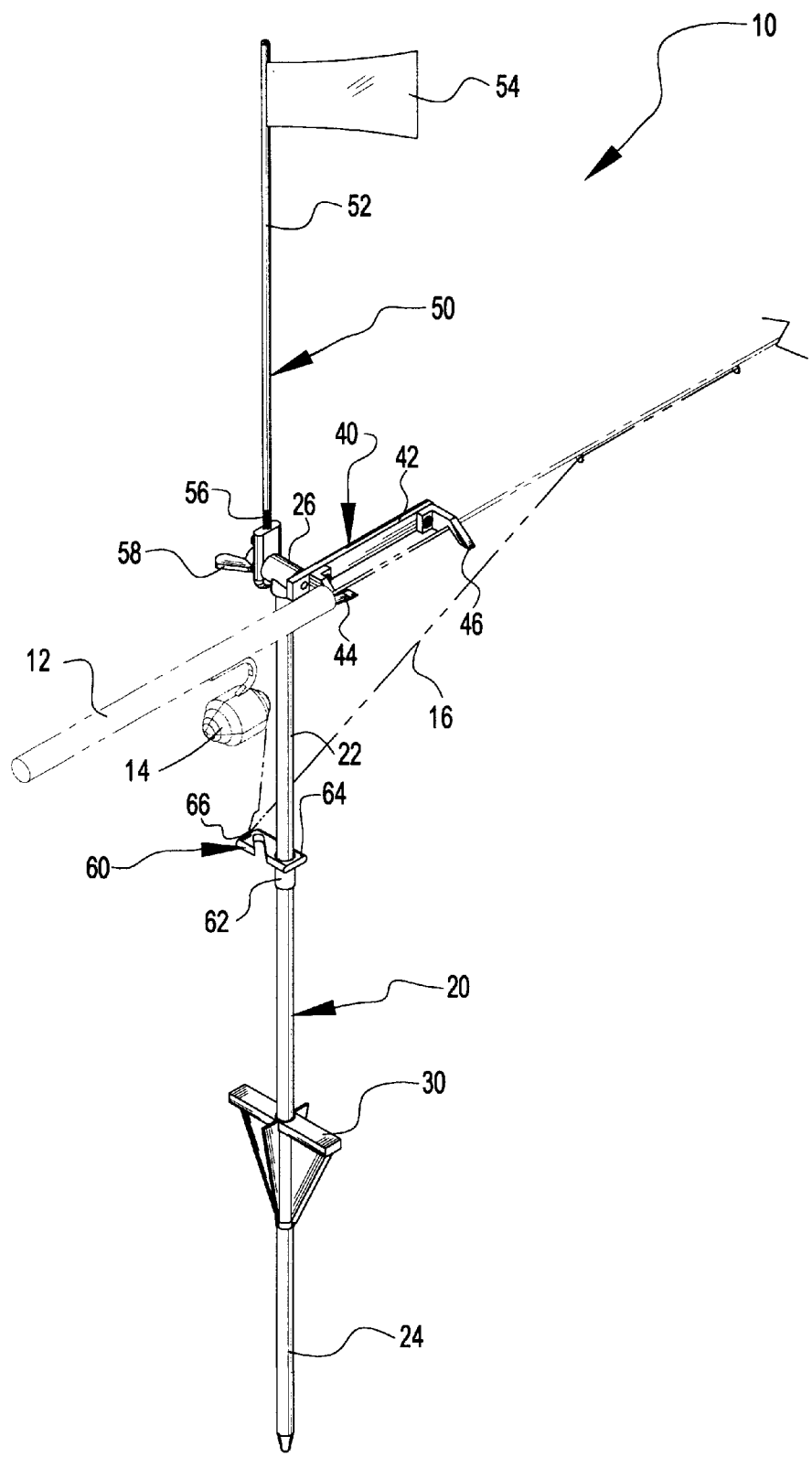
FIG. 1 is an upper perspective view of the present invention with a conventional fishing rod removably attached.

Turning now descriptively to the drawings, in which similar reference characters denote similar elements throughout the several view, FIGS. 1 through 4 illustrate a fishing pole tip-up system 10, which comprises a shaft 20 having a pointed lower end 24, a stability member 30 attached to the shaft 20 near the lower end 24, a rod support 40 pivotally attached to the upper end 22 of the shaft 20, an indicator structure 50 attached to the upper end 22 of the shaft 20, and a catch member 60 pivotally attached to the shaft 20. The lower end 24 of the shaft 20 is designed to penetrate all types of ground surfaces such as sand, gravel or dirt. The rod support 40 comprises a first claw 44 and a second claw 46 for releasably retaining a conventional fishing rod 12 in a relatively horizontal position. The indicator structure 50 comprises a flex spring 56 attached to the upper end 22 of the shaft 20, and a pole 52 with a flag 54 attached to the flex spring 56 opposite of the shaft 20. The catch member 60 includes a slot 64, wherein the slot 64 releasably captures the pole 52 of the indicator structure 50. A catch spring is attached to the distal end of the catch member 60 for releasably capturing a fishing line 16 from the fishing rod 12. When a fish bite occurs, the fishing line 16 is tensioned thereby rotating the catch member 60 toward a parallel position with respect to the fishing rod 12 thereby releasing the pole 52. The pole 52 is forced into a vertical position by the flex spring 56 thereby indicating that a fish has struck. When the catch member 60 is substantially parallel to the fishing rod 12, the coils of the catch spring are substantially parallel to the fishing rod 12 thereby allowing the fishing line 16 to be easily removed with little pulling force from the fish.

Figure 2:
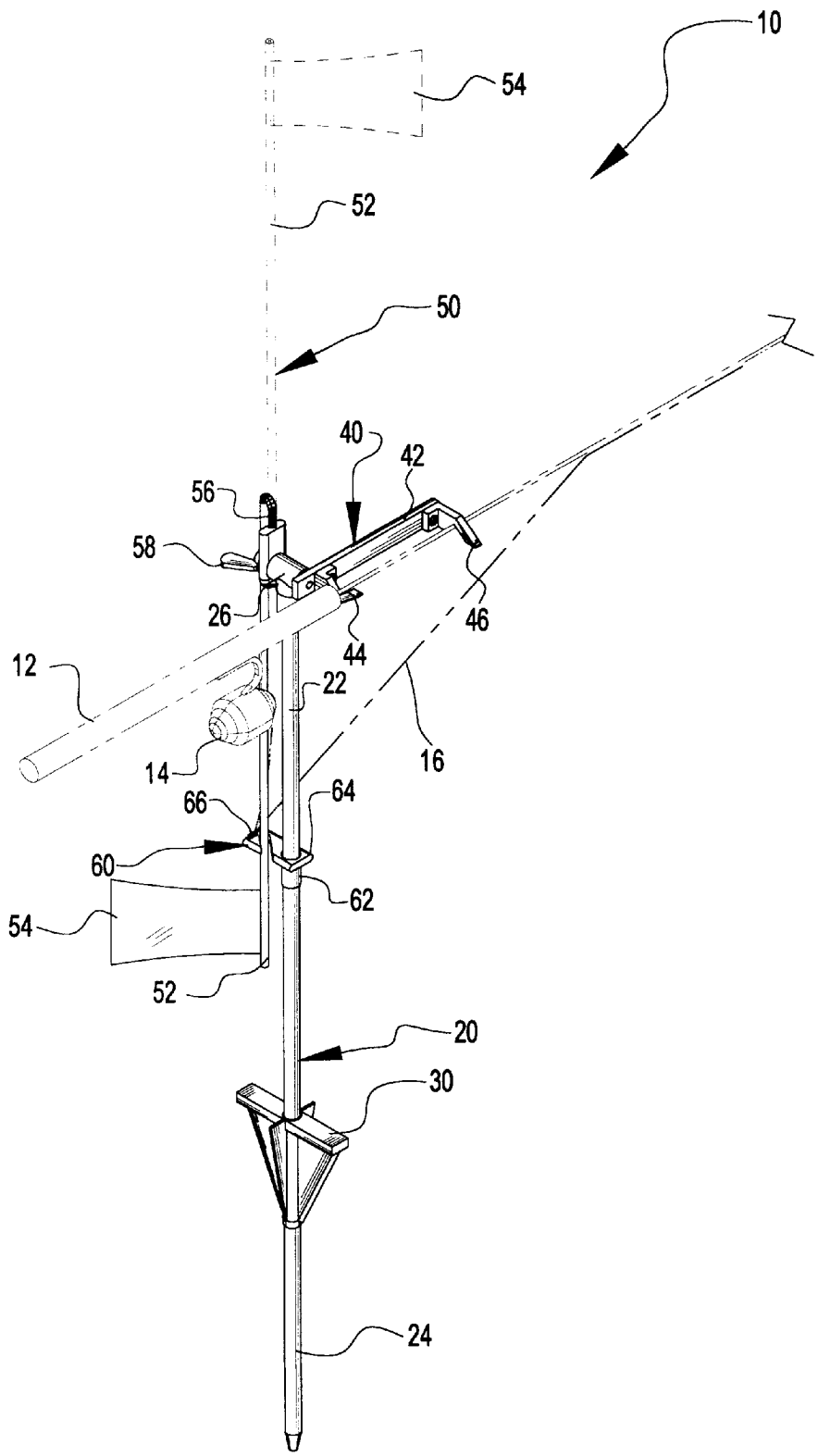
FIG. 2 is an upper perspective view of the present invention with the flag and pole releasably retained by the catch member.
Figure 3:
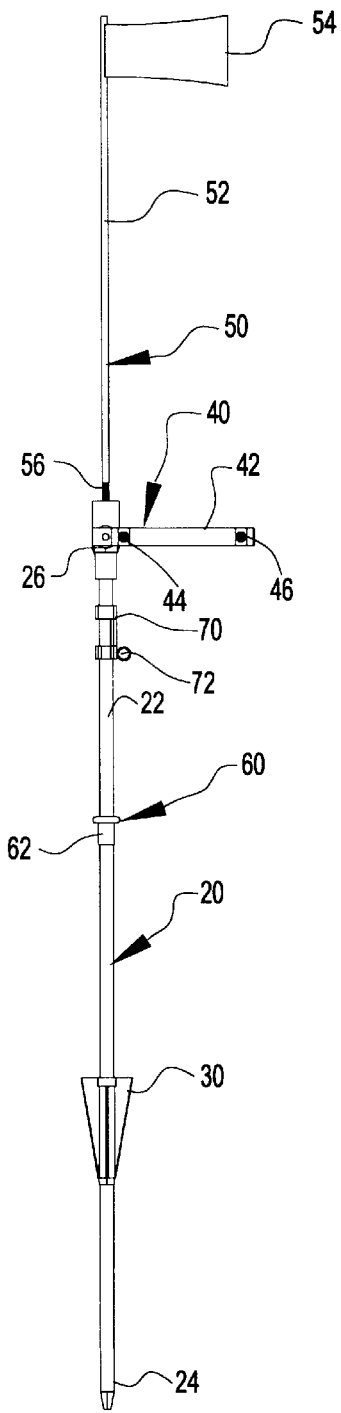
FIG. 3 is a side view of the present invention with the flag in the indicator position.

As shown in FIGS. 1 through 3 of the drawings, the shaft 20 is an elongated structure with a lower end 24 and an upper end 22. The lower end 24 preferably is pointed for easy penetration into a ground surface. A stability member 30 is preferably attached to the shaft 20 near the lower end 24 for allowing a user to step upon for penetrating the ground surface. The stability member 30 also prevents rotation or movement of the shaft 20 even in loose soil conditions.

Figure 4:
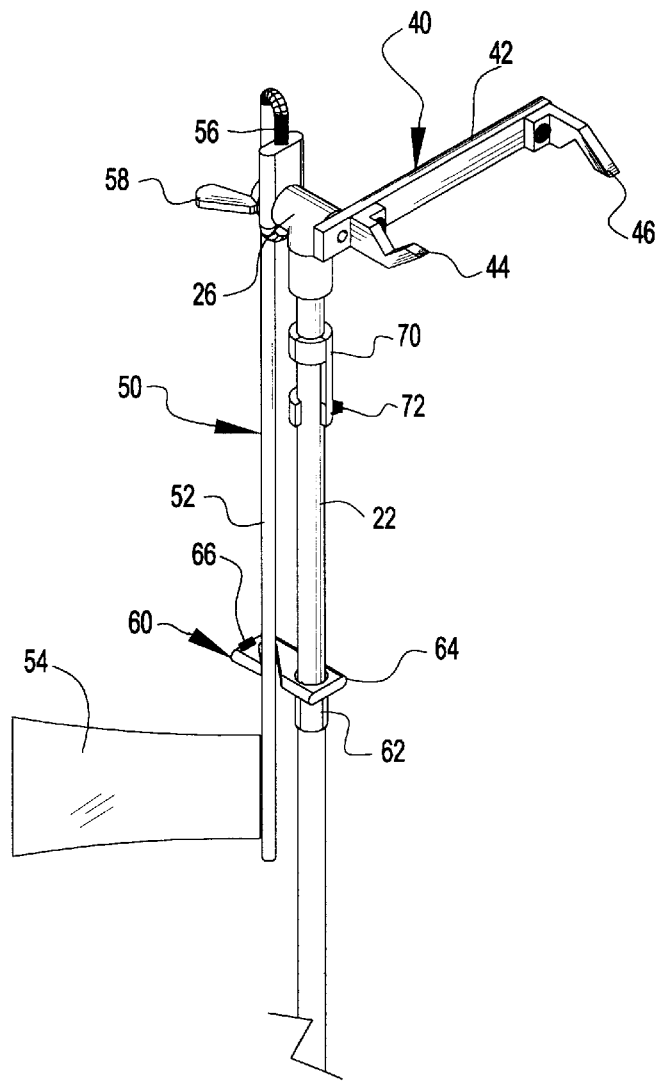
FIG. 4 is a magnified upper perspective view of the catch member releasably retaining the pole.

As best shown in FIG. 4 of the drawings, a T-bracket 26 is preferably attached to the upper end 22 of the shaft 20. A rod support 40 is pivotally attached to the T-bracket 26 by a threaded fastener. A wing nut 58 is threadably attached to the threaded fastener for allowing tightening of the position of the rod support 40. As shown in FIG. 4, the rod support 40 comprises an elongated member 42, a first claw 44 attached to the elongated member 42 and a second claw 46 attached to the elongated member 42. As shown in FIGS. 1 and 2, the fishing rod 12 is removably placed within the rod support 40 where the fishing rod 12 is retained in a substantially horizontal position if desired. The weight of the reel 14 maintains the fishing rod 12 within the rod support 40.

An indicator structure 50 is attached to the T-bracket 26 for indicating when a fish bite has occurred. The indicator structure 50 comprises a flex spring 56 attached to the T-bracket 26 as shown in FIGS. 1 through 4 of the drawings. The indicator structure 50 further includes a pole 52 with a flag 54 attached to the flex spring 56 opposite of the T-bracket 26. The pole 52 and the flag 54 are pivotable about the flex spring 56 allowing the user to position the pole 52 within the catch member 60.

As best shown in FIG. 4, the catch member 60 is pivotally attached to the shaft 20. A support band 62 is frictionally in engagement about the shaft 20 thereby vertically supporting the catch member 60 that is slidably positioned about the shaft 20. The catch member 60 includes a slot 64 that receives the pole 52 of the indicator structure 50 when in the captured position. As best shown in FIG. 1, the slot 64 is preferably at an angle with respect to a longitudinal axis of the catch member 60 for allowing easy releasing of the indicator structure 50.

A first catch spring 66 is attached to the distal end of the catch member 60 for releasably capturing the fishing line 16 from the fishing rod 12 and reel 14. When the fishing line 16 is tensioned from a fish bite, the catch member 60 is rotated clockwise thereby allowing the pole 52 to be released from the slot 64. The coils of the first catch spring 66 are initially orthogonally positioned with respect to the fishing rod 12 thereby increasing the engagement of the fishing line 16. However, when the catch member 60 is rotated and the coils of the first catch spring 66 become closer to parallel to the fishing rod 12 the easier it is for the fishing line 16 to be removed from the first catch spring 66 allowing the fish to continue taking the bait.

As shown in FIGS. 3 and 4, a clamp 70 that is attachable to the shaft 20 is preferably provided. A second catch spring 72 is attached to the clamp 70 for releasably capturing the fishing line 16 between the first catch spring 66 and the bait. The second catch spring 72 prevents accidental releasing of the pole 52 from the catch member 60 by wind or water current forces. The coils of the second catch spring 72 are preferably aligned with the fishing rod 12 for allowing the fishing line 16 to be easily removed, however in extreme weather conditions or strong currents the user may choose to rotate the second catch spring 72 to increase the force necessary to pull the fishing line 16 from the second catch spring 72.

In use, the user casts the bait into the water and positions the fishing rod 12 within the rod support 40 as shown in FIG. 1. The user then pulls a length of the fishing line 16 from the reel 14 forming a loop. The loop of the fishing line 16 is positioned within the coils of the second catch spring 72. The portion of the loop between the second catch spring 72 and the reel 14 is then positioned within the coils of the first catch spring 66 as shown in FIG. 1 of the drawings. As shown in FIG. 2 of the drawings, the pole 52 is bent approximately 180 degrees so that it is captured by the slot 64 within the catch member 60. The flex spring 56 provide pressure upon the pole 52 so that the catch member 60 maintains it position. When a fish bites upon the bait, the loop is first removed from the second catch spring 72 if the force is sufficient. The tensioned fishing line 16 then pulls upon the catch member 60 thereby rotating it clockwise away from the pole 52 thereby allowing the pole 52 to be released from the catch member 60. The pole 52 and flag 54 are then allowed to be positioned substantially vertically thereby alerting the user that a fish bite has occurred. The tensioned fishing line 16 is further pulled by the fish with little resistance thereby rotating the catch member 60 until the coils of the first catch spring 66 are substantially parallel to the fishing rod 12 making it easier to remove the fishing line 16 from the first catch spring 66. The fishing line 16 is then removed from the first catch spring 66 and the fish is allowed to continue taking the bait without significant resistance. The user then grasps the fishing rod 12 and easily removes the fishing rod 12 from rod support 40 thereby allowing the user to reel 14 in the fish. Upon removal of the fish, the above process is again repeated.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing pole tip-up system, comprising:
    a shaft having a lower end and an upper end;
    a rod support attached to said shaft for removably supporting a conventional fishing rod;
    an indicator structure attached to said upper end of said shaft; and
    a catch means attached to said shaft that releases said indicator structure into a vertical position upon detecting tension upon a fishing line from a fish bit;
    wherein said indicator means comprises:
        a flex spring attached to said upper end of said shaft;
        a pole attached to said flex spring opposite of said shaft; and
    an indicator member attached to said pole opposite of said flex spring;
    wherein said catch means comprises:
        a catch member rotatably connected about said shaft;
        a slot extending into said catch member for removably receiving said pole; and
        an engaging means attached to a distal end of said catch member for releasably engaging said fishing line.

2. The fishing pole tip-up system of claim 1, wherein said engaging means applies greater force upon said fishing line when said catch member is orthogonal to said fishing rod than when said catch member is parallel to said fishing rod.

3. The fishing pole tip-up system of claim 2, wherein said engaging means comprises a first catch spring that frictionally engages said fishing line.

4. The fishing pole tip-up system of claim 3, wherein a longitudinal axis of said first catch spring is orthogonal to a longitudinal axis of said catch member.

5. The fishing pole tip-up system of claim 1, wherein said rod support comprises:
    an elongated member pivotally attached to said upper end of said shaft;
    a first claw attached to said elongated member; and
    a second claw attached to said elongated member, wherein said first claw is pointed opposite of said second claw for receiving said fishing rod.

6. The fishing pole tip-up system of claim 1, including a friction means that is attachable to said shaft for engaging said fishing line between said first catch spring and a bait attached to said fishing line thereby preventing accidental movement of said catch member by forces other than said fish bite.

7. The fishing pole tip-up system of claim 6, wherein said friction means comprises:
    a clamp removably attachable to said shaft; and
    a second catch spring.

8. The fishing pole tip-up system of claim 1, including a support band frictionally in engagement about said shaft for supporting said catch member at a desired elevation along said shaft.

9. A fishing pole tip-up system, comprising:
    a shaft having a lower end and an upper end:
    a stability member attached to said shaft adjacent said lower end;
    a rod support attached to said shaft for removably supporting a conventional fishing rod;
    an indicator structure attached to said upper end of said shaft; and
    a catch means attached to said shaft that releases said indicator structure into a vertical position upon detecting tension upon a fishing line from a fish bite;
    wherein said indicator means comprises:
        a flex spring attached to said upper end of said shaft;
        a pole attached to said flex spring opposite of said shaft; and an indicator member attached to said pole opposite of said flex spring;

wherein said catch means comprises:

a catch member rotatably connected about said shaft;

a slot extending into said catch member for removably receiving said pole; and an engaging means attached to a distal end of said catch member for releasably engaging said fishing line.

10. The fishing pole tip-up system of claim 9, wherein said engaging means applies greater force upon said fishing line when said catch member is orthogonal to said fishing rod than when said catch member is parallel to said fishing rod.

11. The fishing pole tip-up system of claim 10, wherein said engaging means comprises a first catch spring that frictionally engages said fishing line.

12. The fishing pole tip-up system of claim 11, wherein a longitudinal axis of said first catch spring is orthogonal to a longitudinal axis of said catch member.

13. The fishing pole tip-up system of claim 9, wherein said rod support comprises:

an elongated member pivotally attached to said upper end of said shaft;

a first claw attached to said elongated member; and a second claw attached to said elongated member, wherein said first claw is pointed opposite of said second claw for receiving said fishing rod.

14. The fishing pole tip-up system of claim 9, including a friction means that is attachable to said shaft for engaging said fishing line between said first catch spring and a bait attached to said fishing line thereby preventing accidental movement of said catch member by forces other than said fish bite.

15. The fishing pole tip-up system of claim 14, wherein said friction means comprises:

a clamp removably attachable to said shaft; and a second catch spring.

16. The fishing pole tip-up system of claim 9, including a support band frictionally in engagement about said shaft for supporting said catch member at a desired elevation along said shaft.

17. A fishing pole tip-up system, comprising:

a shaft having a lower end and an upper end;

a rod support attached to said shaft for removably supporting a conventional fishing rod;

an indicator structure attached to said upper end of said shaft;

a catch member rotatably connected about said shaft;

a slot extending into said catch member for removably receiving said indicator; and an engaging means attached to a distal end of said catch member for releasably engaging said fishing line, wherein said catch member catchably releases said indicator structure into a vertical position upon detecting tension upon a fishing line from a fish bite.

18. The fishing pole tip-up system of claim 17, wherein said indicator means comprises:

a flex spring attached to said upper end of said shaft;

a pole attached to said flex spring opposite of said shaft; and an indicator member attached to said pole opposite of said flex spring.

19. The fishing pole tip-up system of claim 17, wherein said engaging means applies greater force upon said fishing line when said catch member is orthogonal to said fishing rod than when said catch member is parallel to said fishing rod.

20. The fishing pole tip-up system of claim 17, wherein said engaging means comprises a first catch spring that frictionally engages said fishing line.

* * * * *